US009920706B1

United States Patent
Yavid et al.

(10) Patent No.: US 9,920,706 B1
(45) Date of Patent: Mar. 20, 2018

(54) METHODS OF LASER POWERING UNMANNED AERIAL VEHICLES WITH HEAT ENGINES

(71) Applicants: Dmitriy Yavid, Stony Brook, NY (US); Stephen Jon Blank, East Norwich, NY (US)

(72) Inventors: Dmitriy Yavid, Stony Brook, NY (US); Stephen Jon Blank, East Norwich, NY (US)

( * ) Notice: Subject to any disclaimer, the term of this patent is extended or adjusted under 35 U.S.C. 154(b) by 120 days.

(21) Appl. No.: 15/009,080

(22) Filed: Jan. 28, 2016

Related U.S. Application Data

(60) Provisional application No. 62/110,628, filed on Feb. 2, 2015.

(51) Int. Cl.
| | | |
|---|---|---|
| *F02G 1/02* | (2006.01) | |
| *B64G 1/40* | (2006.01) | |
| *F01B 17/02* | (2006.01) | |
| *F03G 7/00* | (2006.01) | |
| *B64C 39/02* | (2006.01) | |
| *H05B 7/18* | (2006.01) | |
| *F01B 29/10* | (2006.01) | |

(52) U.S. Cl.
CPC .............. *F02G 1/02* (2013.01); *B64C 39/024* (2013.01); *B64G 1/40* (2013.01); *B64G 1/409* (2013.01); *F01B 17/02* (2013.01); *F01B 17/022* (2013.01); *F01B 17/025* (2013.01); *F01B 29/10* (2013.01); *F03G 7/00* (2013.01); *H05B 7/18* (2013.01); *B64C 2201/04* (2013.01); *B64C 2201/046* (2013.01); *B64C 2201/048* (2013.01); *B64C 2201/06* (2013.01)

(58) Field of Classification Search
CPC .......... F02G 1/02; F01B 29/10; F01B 17/025; F01B 17/022; F01B 17/02; F03G 7/00; H05B 7/18; B64C 39/024; B64C 2201/048; B64C 2201/04; B64C 2201/06; B64C 2201/046; B64G 1/40; B64G 1/409
USPC ............. 60/508–515, 650, 682–684; 244/62, 244/171.1, 172.7
See application file for complete search history.

(56) References Cited

U.S. PATENT DOCUMENTS

| | | | | |
|---|---|---|---|---|
| 3,825,211 A | * | 7/1974 | Minovitch | ............. B64G 1/409 244/171.1 |
| 5,137,353 A | * | 8/1992 | Seegmiller | .............. G01M 9/06 250/225 |
| 5,542,247 A | | 8/1996 | Bushman | |
| 6,282,894 B1 | * | 9/2001 | Smith | ....................... F02C 1/10 60/509 |
| 6,993,898 B2 | * | 2/2006 | Parkin | ..................... F03H 99/00 244/62 |
| 7,444,817 B2 | * | 11/2008 | Ito | .......................... G02B 21/32 60/650 |
| 8,876,061 B1 | | 11/2014 | Tillotson | |

(Continued)

FOREIGN PATENT DOCUMENTS

CN          101169043          4/2008

*Primary Examiner* — Hoang Nguyen
(74) *Attorney, Agent, or Firm* — Donald J. Ersler

(57) ABSTRACT

Methods of laser powering unmanned aerial vehicles (UAV) with heat engines are disclosed. The laser powered heat engines are used in conjunction with devices for absorbing laser optical radiation, turning the laser optical radiation into heat, supplying the heat to a working fluid of the heat engine and harvesting mechanical work from expanding working fluid in the heat engine.

17 Claims, 10 Drawing Sheets

(56) References Cited

U.S. PATENT DOCUMENTS

| | | |
|---|---|---|
| 8,881,526 B2 | 11/2014 | Bastian, II et al. |
| 2013/0032673 A1* | 2/2013 | Kobayashi ............... B64G 1/44 |
| | | 244/158.4 |
| 2013/0061571 A1* | 3/2013 | Burdine ................... B64G 1/42 |
| | | 60/204 |
| 2014/0306065 A1* | 10/2014 | Palmer ................... B64G 1/402 |
| | | 244/171.1 |
| 2014/0318620 A1 | 10/2014 | Kare et al. |

* cited by examiner

METHODS OF LASER POWERING UNMANNED AERIAL VEHICLES WITH HEAT ENGINES

CROSS-REFERENCES TO RELATED APPLICATIONS

This is a utility patent application taking priority from provisional application No. 62/110,628 filed on Feb. 2, 2015.

BACKGROUND OF THE INVENTION

Field of the Invention

The present invention relates generally to powering an aircraft and more specifically to methods of powering unmanned aerial vehicles (UAV) with heat engines, which are used in conjunction with devices for absorbing laser optical radiation, converting the light into heat, supplying the heat to a working fluid of the heat engine and harvesting mechanical work from expanding working fluid in the heat engine.

Discussion of the Prior Art

A concept of delivering power to a remote location by means of a laser beam has been known for some time. It is especially attractive for powering Unmanned Aerial Vehicles (UAV), also known as drones, due to their limited ability to carry large stores of fuel or large batteries, while a remote laser can power them for unlimited time. It can also be used for powering surface vehicles, spacecraft, as well as stationary objects in remote places.

Laser-powered UAV has been successfully demonstrated by a company LaserMotive, as disclosed, for example, in United States Patent Application 20140318620. In the above-mentioned example, the UAV carries a semiconductor photonic receptor, which converts incident photons within a specific wavelength band into electrons and/or other electric charge carriers, in a way similar to solar panels. The electricity thus generated is used to power an electric motor, which in turn powers the UAV's propulsion system, as well as other electric loads onboard.

A characteristic feature of photonic receptors made from semiconductor materials is their limited temperature range due to considerable changes in the properties of semiconductor materials, and hence, a limited power density that they can handle. Another characteristic feature of photonic receptors made from semiconductor materials is the limited range of wavelengths they can convert: typically, no longer than ~2 um, due to very low energy of the photons of longer wavelength, which becomes comparable with thermal energy at typical ambient temperatures. Consequently, semiconductor materials capable of converting longer wavelength typically have large leakage currents and hence are not practical as photonic power converters. On the other hand, wavelengths longer than approximately 1.5 um are considered "eye-safe", which is of particular advantage for powering UAVs. There are also highly efficient lasers in this range, such as CO2 lasers emitting around 10.6 um.

An alternative method to convert optical power directly into mechanical power is to use it as a heat source for a heat engine, such as a rocket engine, a turbine, or a reciprocating engine, in lieu of fuel combustion commonly used in such engines. For example, U.S. Pat. No. 8,876,061 teaches a method for producing a heated fluid using power supplied by an electromagnetic beam and then used as a working fluid of a rocket engine. U.S. Pat. No. 8,881,526 teaches a steam turbine where water is vaporized by a laser. China Patent CN 101169043 teaches a reciprocating steam engine where water is vaporized by a laser. A common feature of these inventions is the use of a dedicated working fluid, which needs to be carried by a vehicle and eventually replenished for prolonged use.

There are also known methods of using ambient air as a working fluid of a laser-powered heat engines, such as the one taught in U.S. Pat. No. 5,542,247, where highly concentrated laser light is absorbed directly by air, causing molecular disassociation and resulting in increased air pressure and temperature. This process however is inherently inefficient and difficult to implement, due to relatively low absorption of air and thus the need for very high laser power density.

SUMMARY OF THE INVENTION

Methods of laser powering unmanned aerial vehicles (UAV) with heat engines are disclosed. The laser powered heat engines are used in conjunction with devices for absorbing laser optical radiation, turning the laser optical radiation into heat, supplying the heat to a working fluid of the heat engine and harvesting mechanical work from expanding working fluid in the heat engine.

OBJECTS OF THE INVENTION

The present invention is aimed primarily at providing reliable and efficient methods of powering a UAV with a remote laser. Powering remotely other surface vehicles or stationary objects is also an object of this invention.

One object is overcoming the wavelength and power density limitations of existing photonic receptors.

Another object is overcoming the limitations of existing heat engines using consumable working fluids.

Yet another object is overcoming the limitations of existing laser-powered air-breezing heat engines, mainly, the complexity of tight focusing due to low absorption of air and efficiency loss due to air molecular disassociation at high power densities.

DETAILED DESCRIPTION OF THE INVENTION

The following description lists several embodiments of the present invention, which are merely exemplary of many variations and permutations of subject matter disclosed. Mention of one or more representative features of a given embodiment is likewise exemplary: an embodiment can exist with or without a given feature, and likewise, a given feature can be part of other embodiments.

Figure 1:
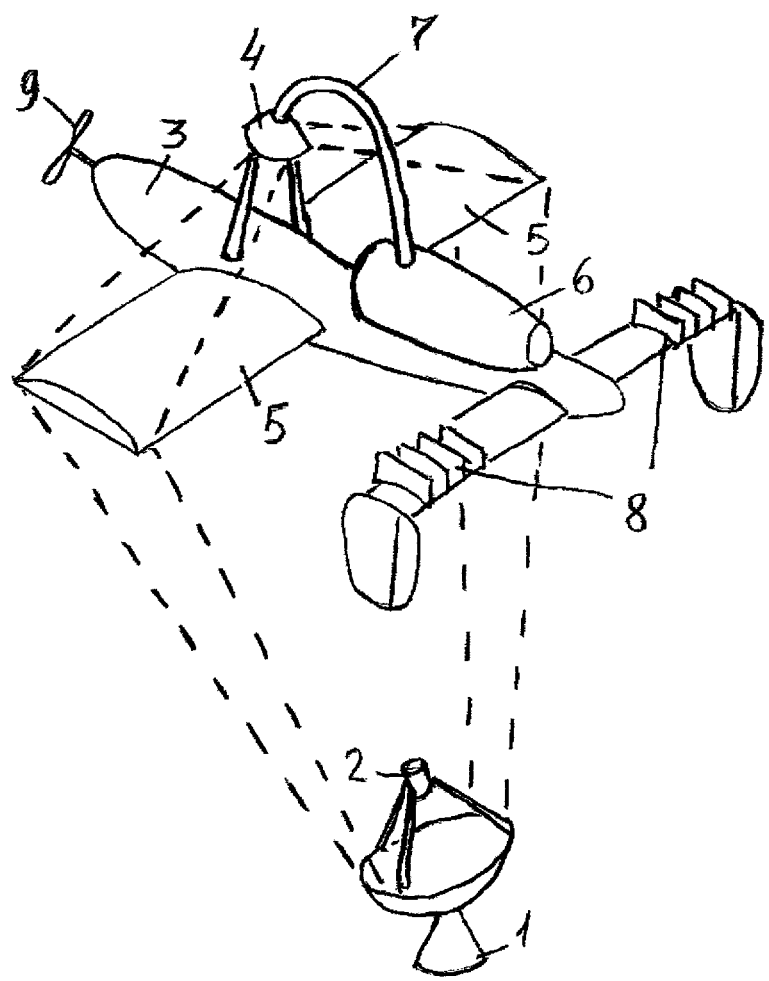
FIG. 1 is a perspective view of a general concept of UAV with heat engine wirelessly powered by beam of optical radiation.

With reference to FIG. 1, one embodiment of the invention includes a base station 1, which can be ground-based, or carried by a larger manned or unmanned aerial vehicle, with the laser power source 2, and tracking and control means. It also includes a fixed-wing UAV 3 with a heat engine 6 providing thrust. It also includes an impeller 9 driving an electric generator for powering auxiliary equipment of the UAV. Alternatively, if the heat engine 6 is a turbine engine, it may drive the electric generator directly. Radiators 8 are employed to dispose off of the excess heat generated by the engine and/or auxiliary equipment of the UAV. The embodiment also includes an optical concentrator 5, for example, a Fresnel lens embedded in the transparent wings of the UAV, with appropriate tracking and adjustment means to direct the concentrated laser light toward the proximal face 4 of the fiber bundle 7, leading to the heat engine 6.

Figure 2:
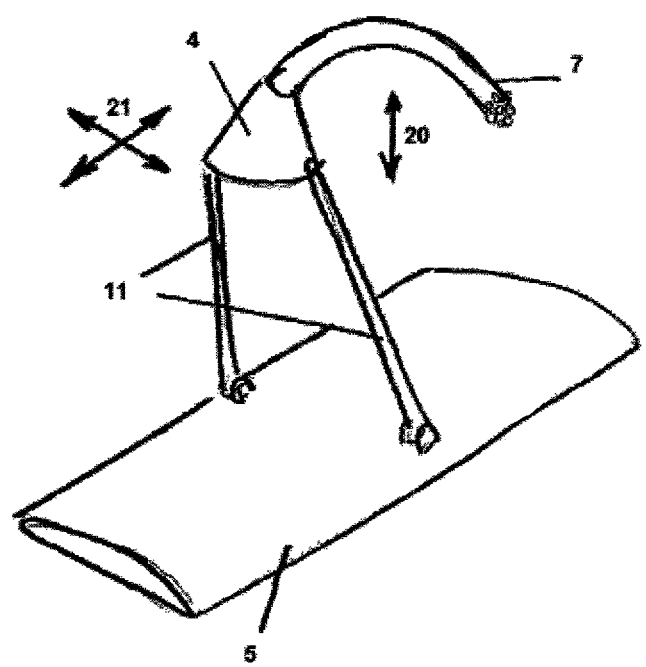
FIG. 2 is a partially exploded perspective view of an adjustable optical receptor, and fiber-optic power delivery to a turbojet engine.

A preferable tracking and adjustment arrangement includes movable supports 11 as detailed of FIG. 2, adjusting the focus 20 and directional position 21 of the proximal fiber bundle face 4, under the control of optical sensors (not shown) positioned on or around the proximal fiber bundle face 4. Since the position of the focal point of the optical concentrator 5 depends on the direction from which the laser beam is coming and the convergence/divergence of said beam, the adjustment of movable supports 11 is carried out in a way that places the proximal fiber bundle face 4 as close to the focal point of the optical concentrator 5 as possible. Additionally, the base station 1 has means of tracking the UAV 3 and directing the laser beam toward it. In one embodiment, the heat engine 6 is turbine jet.

Figure 3A:
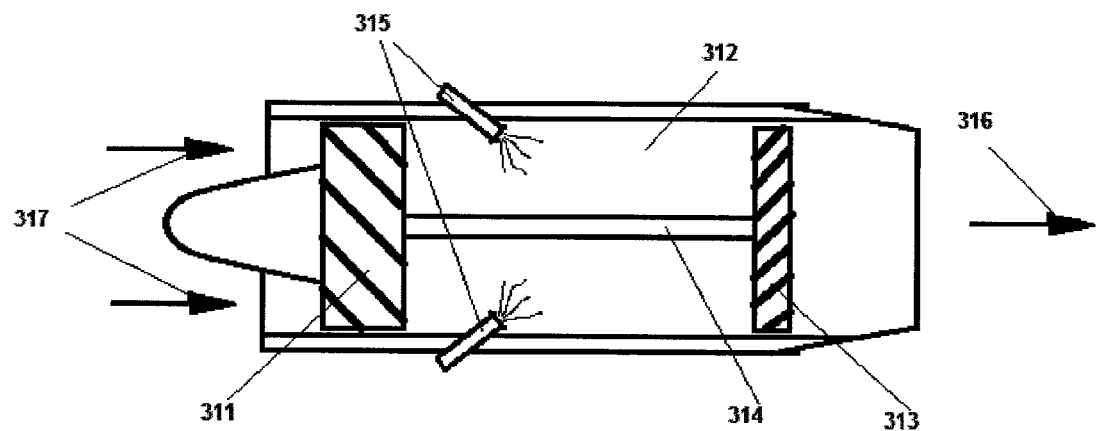
FIG. 3a is a cross sectional view of a conventional, internal combustion turbine jet engine.

FIG. 3A diagrammatically represents a conventional, internal combustion turbine jet: an incident air flow 317 is compressed by the compressor 311 and directed toward combustion chamber 312, past fuel injectors 315. While fuel-air mixture is combusted, it heats up and expands toward turbine 313 at high speed. Expansion through turbine 313 and further out of the engine forming the exhaust jet 316 causes the hot combustion gas to cool down while converting part of its energy into the mechanical work of propelling the engine forward, as well as of driving the compressor 311, which sits on the common shaft 314 with the turbine 313. Additionally, part of the mechanical work may be used to drive an electric generator or other auxiliary loads.

Figure 3B:
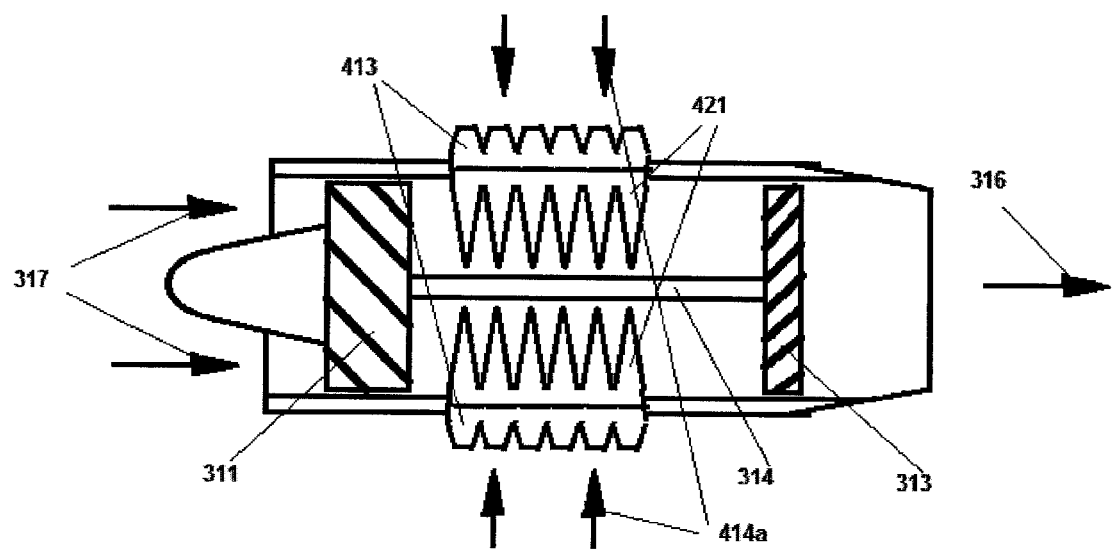
FIG. 3b is a cross sectional view of a laser-powered turbine jet engine.

FIG. 3B comparatively illustrates a laser-powered turbine jet of the present invention. It differs in that fuel injectors 315 of the conventional engine are replaced with heat exchangers 421, which are in thermal contact with solid optical absorbers 413. Optical power from the laser light 414a is directed to the optical absorbers 413 thus heating them up. It should be noted that in this embodiment the optical power is delivered continuously, while in other embodiments it is delivered in pulses and designated 414b (see FIG. 6B), to emphasize this distinction. The heat then propagates through thermal contact to heat exchangers 421, and then ultimately to the air flowing through heat exchangers 421, heating it up as well. Thereafter, the heated air behaves substantially the same way as the combustion gas of the conventional engine: it expands through the turbine 313 and forms the exhaust jet 316, thus providing thrust, driving the compressor and possibly, other loads.

It should be noted that heat exchangers 421 are configured to maximize their surface area, and thus facilitate the heat transfer from them to the airflow. The thermal resistance between the optical absorbers 413 and heat exchangers 421 should also be lowered as much as possible, by making both from highly thermo-conductive materials and providing reliable contact between them, or possibly, fabricating them both from a single piece of a material. They are also configured to withstand high temperatures.

Figure 4A:
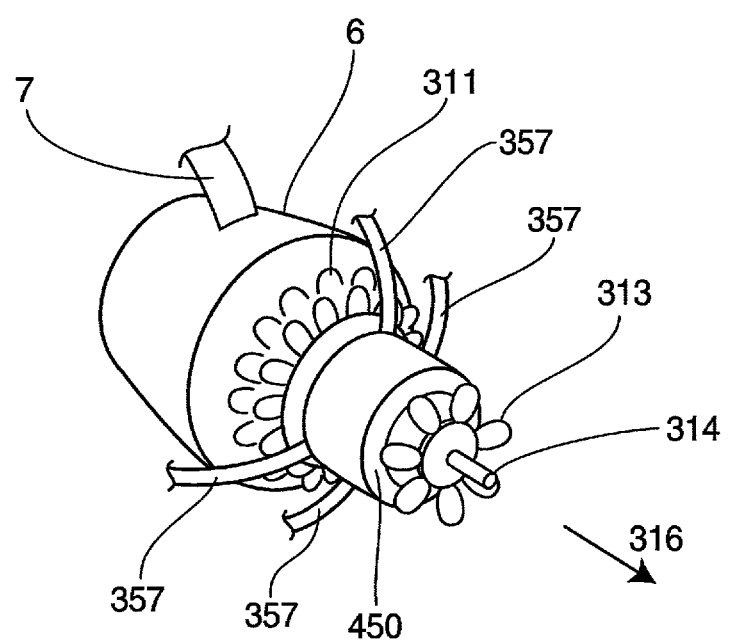
FIG. 4a is a perspective view of distal ends of fiber optic cables for delivering power to multiple optical absorbers.
Figure 4B:
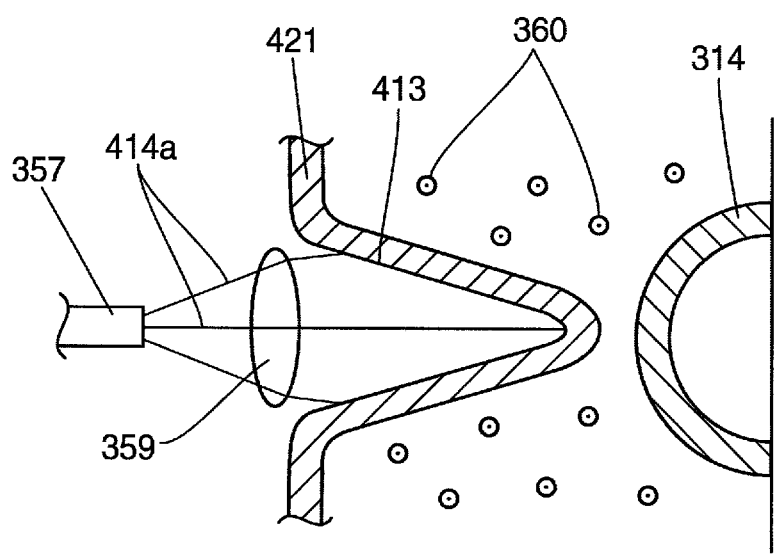
FIG. 4b is a cross sectional view of a single fiber optical cable for delivering power to a single optical absorber.

The advantages of using the fiber optic bundle 7 for optical power delivery is further illustrated by FIG. 4A, showing individual fibers 357 distributed around the combined optical absorber/heat exchanger block 450. Since multiple optical fibers are used, the optical power may be distributed uniformly around the block 450, which would be difficult to achieve with a single laser beam. As further illustrated by a cross-sectional view on FIG. 4B, the block 450 includes a heat exchanger 421 with multiple ridges protruding into the airflow. The airflow on FIG. 4B is designated by dots 360 and is assumed to be flowing out of the plane of the page and toward the viewer. An optical absorber 413 in this embodiment takes the form of an absorptive coating on a concave inner surface of the heat exchanger 421, which is illuminated by the laser light 414a, emanating for the tip of the optical fiber 357. An optical element 359 may be inserted between the fiber and the optical absorber to distribute the light more uniformly.

Figure 5:
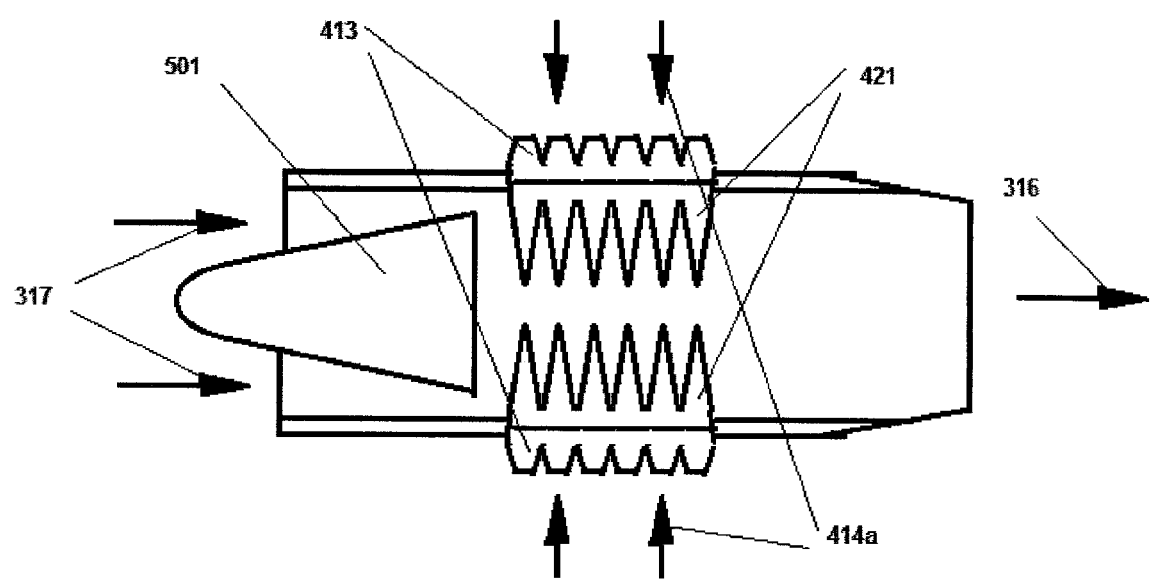
FIG. 5 is a cross sectional view of a ramjet for powering a UAV.

Jet engines other than turbine jet may be adapted to the method of laser powering suggested by the present invention. FIG. 5 illustrates a ramjet engine adapted likewise, with its fuel injectors replaced by a combination of heat exchangers 421 and optical absorbers 413. The incident airflow 317 is admitted into the engine and compressed by the inlet spike 501, before flowing past the heat exchangers 421. There, the air heats up and expands toward the rear of the engine, forming the exhaust jet 316 and thus propelling the engine forward.

It should be noted, that laser-power ramjet engines, just like fuel-combusting ones, depend on the high air speed to pressurize the air flow, and hence provide little or no thrust at low speed.

Figure 6A:
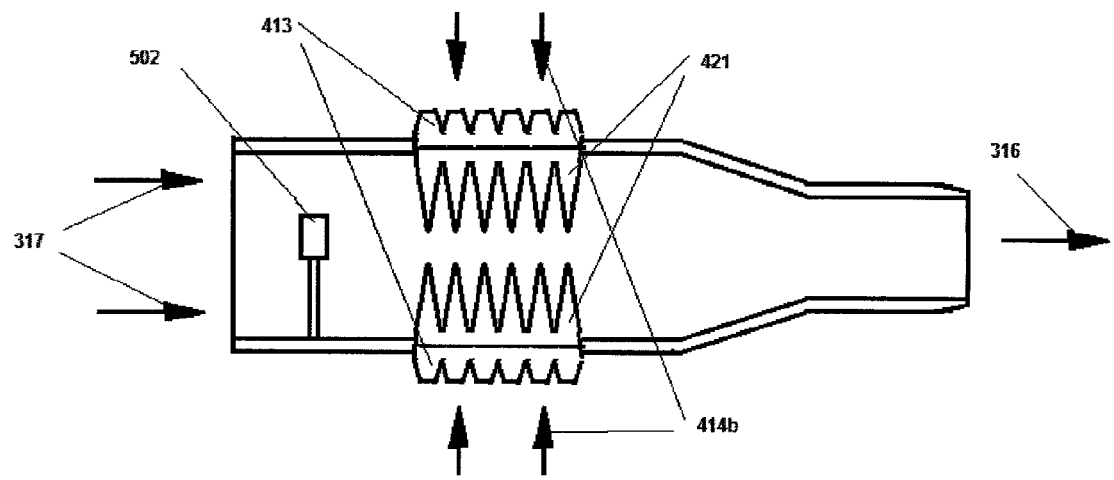
FIG. 6a is a cross sectional view of a pulsejet for powering a UAV.
Figure 6B:
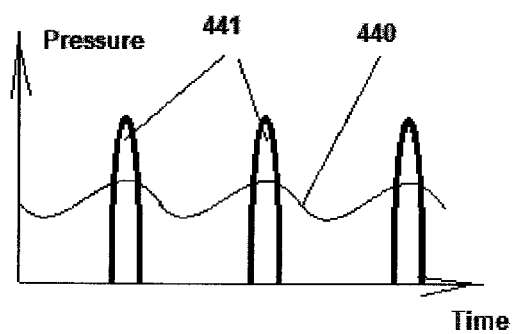
FIG. 6b is a graph illustrating pressure vs. time for a pulsejet.

Discussed insofar were the embodiments relying upon continuous optical power generated by the laser. However, the ability of the laser to deliver short pulses of optical power, and synchronize the timing of those pulses with internal engine processes create a unique advantage for laser-powered heat engines. Such advantage is illustrated by FIG. 6A, showing a laser-powered pulsejet engine. Again, as in the case of turbine jet and ramjet, heat exchangers 421 are positioned in the air flow, in place of the fuel injectors of a conventional fuel-combusting engine, and the laser light 414b provides the power for heating up the air and forming the exhaust jet 316, thus generating thrust. However, conventional pulsejets rely on intermittent combustion, facilitated by the aerodynamic resonance in engine's tail pipe and corresponding periodic rise of air pressure. Fuel injection, and/or fuel ignition is conventionally timed to such rise in pressure. Likewise, the laser pulses 441 are delivered at or near the point of the highest pressure on the time/pressure curve 440, as further illustrated by FIG. 6B. Such synchronization may be achieved passively, i.e. by choosing the frequency of the laser pulses to be close to a known frequency of the tail pipe aerodynamic resonance, or actively, by taking the pressure measurements with the pressure sensor 502, and communicating those measurements back to the remote laser.

Figure 7A:
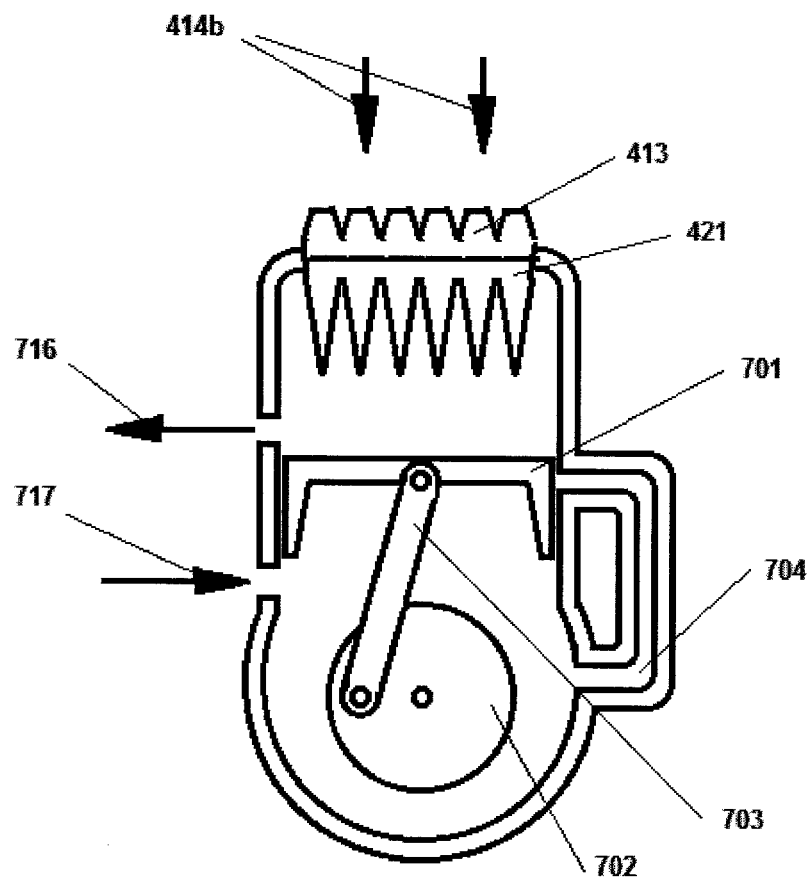
FIG. 7a is a cross sectional view of a reciprocating engine for powering a UAV.
Figure 7B:
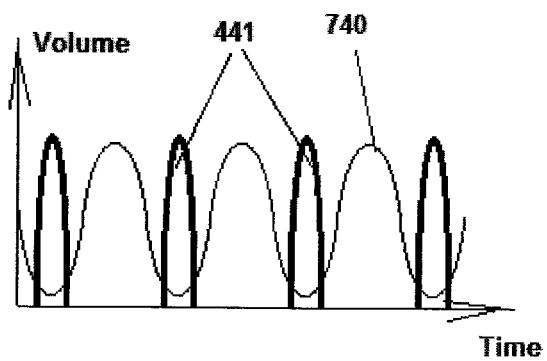
FIG. 7b is a graph illustrating volume vs. time for a reciprocating engine.

The method of the present invention may also be used for laser powering various reciprocating heat engines. FIG. 7A shows the embodiment similar to a conventional two-stroke internal combustion engine. Ambient air 717 is admitted into the engine during the upward motion of the piston 701, and then displaced through the transfer port 704 during the downward piston motion. During subsequent piston upward motion, it is compressed and directed toward the heat exchanger 421. As in the other embodiments above, the laser light 414b is absorbed by optical absorber 413, with the heat thus generated transferred to heat exchanger 421 and then to the air around it. While both continuous and pulsed laser light can be used to power a reciprocating heat engine, the embodiment shown on FIG. 7A employs pulsed light, coming at or near the moment when piston 701 reaches the topmost point, and respectively, the volume of air above the piston is minimal, as illustrated by FIG. 7B. Thus, the air is heated only during the power stroke, which increases the engine efficiency and lowers its working temperature. The appropriate moment can be established by measuring the phase angle of the engine; therefore no special sensor is required. The reciprocating motion of piston 701 is transferred to crankshaft 702 through the connecting rod 703, so the mechanical power produced by the engine may be used to drive a UAV propeller, or an electric generator, or other loads.

Figure 8:
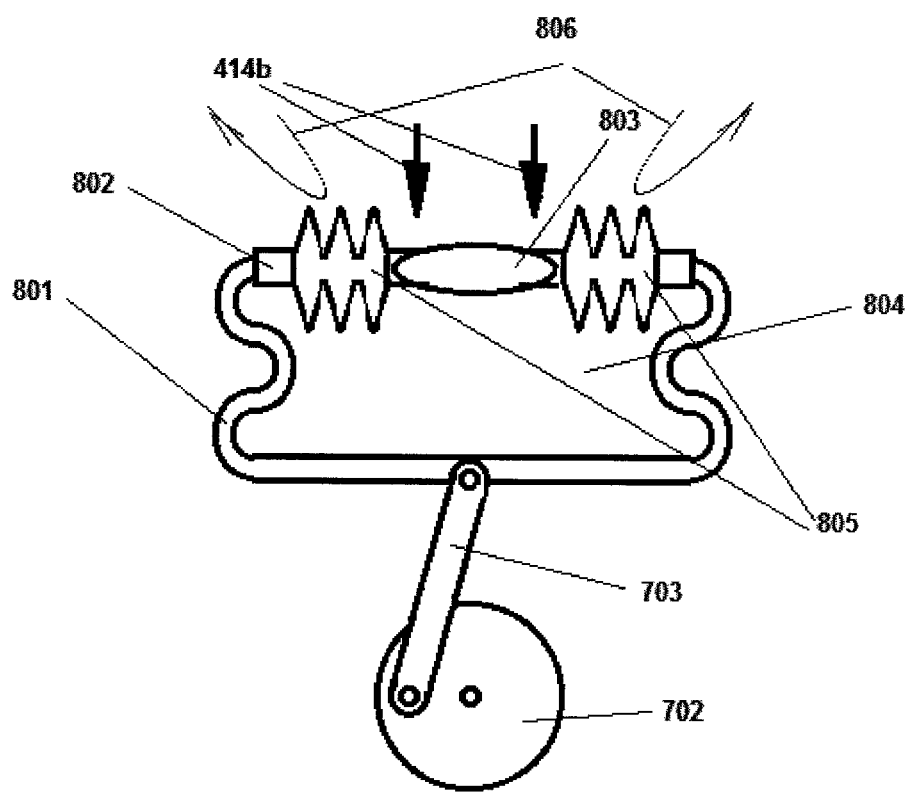
FIG. 8 is a schematic diagram of a trapped, optically-absorptive working fluid in a reciprocating engine for powering a UAV.

Yet another embodiment of the reciprocating laser-powered heat engine is shown in FIG. 8. In this embodiment, the working fluid 804 of the engine is trapped inside a sealed diaphragm working chamber 801. The working fluid, which can be either gaseous or liquid, is chosen to be absorptive for the wavelength of the laser. One example of such fluid would be sulfur hexafluoride, highly absorptive to radiation of common CO2 lasers at wavelength of around 10.6 um. Pulses of laser light 414b are coming through the window 803, optically-transparent for the chosen wavelength, with is installed in a stationary base plate 802. Absorbing the power of the light pulses 414b, the working fluid 804 heats up and expands forcing the diaphragm working chamber 801 to stretch, thus driving the crankshaft 702 through the connecting rod 703, so the mechanical power produced by the engine may be used to drive a UAV propeller, or an electric generator, or other loads. In the absence of optical power in-between adjacent laser pulses, the working fluid 804 cools down losing heat through heat exchangers 805, which are also installed in the stationary base plate 802 and cooled externally by ambient air 806 or other means. It should be noted that in this embodiment the role of heat exchangers 805 is rather different from heat exchangers 421 in other embodiments discussed above: heat exchangers 421 supply heat to the air in the engine, while waste heat is mostly removed through the exhaust of that air, while heat exchangers 805 remove waste heat from the trapped working fluid. The laser pulses are timed to the minimal volume of the working fluid as per FIG. 7B, by measuring the phase angle of the engine and communicating it back the laser.

Figure 9:
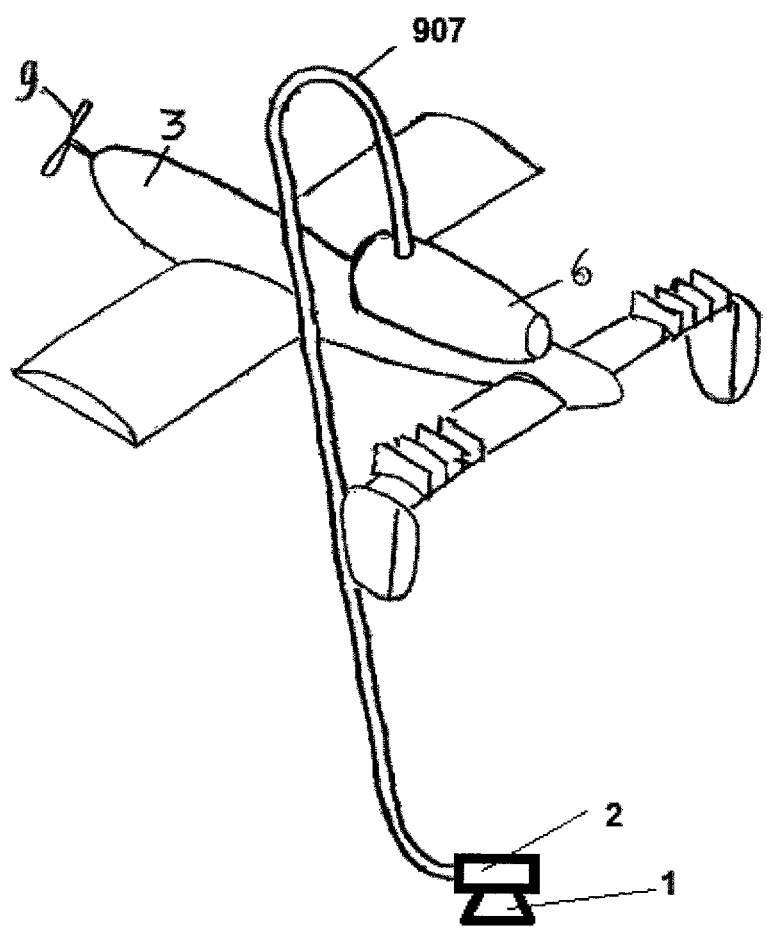
FIG. 9 is a perspective view of a long optical fiber or fiber bundle, which delivers optical power from a remote laser directly to a heat engine 6 of a UAV.

Yet another embodiment, as shown on FIG. 9 provides a long optical fiber or fiber bundle 907, which delivers optical power from remote laser 2 directly to the heat engine 6 of the UAV 3. While this approach limits the effective range of the UAV, it allows to greatly simplify the controls, as aiming and concentration of a free-space laser beam is no longer required. The base station 1 provides only laser power control and synchronization of the laser in pulse mode with the heat engine.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A method of powering an open-cycle heat engine, using ambient air as its working fluid, by a remote laser, comprising the steps of:
    generating optical radiation with a remote laser;
    directing said optical radiation onto a solid absorber;
    inputting a volume of ambient air from the atmosphere into said open-cycle heat engine; and
    directing said ambient air into a heat exchanger that is in thermal contact with said solid absorber, said ambient air is heated to expand and perform mechanical work through said open-cycle heat engine;
    said optical radiation is delivered from said remote laser to said open cycle heat engine with a free-space laser beam;
    measuring a position of said open-cycle heat engine with respect to said remote laser;
    communicating said position measurement to said remote laser; and
    adjusting a direction and focusing said remote laser to maximize said optical radiation delivered to said open-cycle heat engine.

2. The method of claim 1, where said open-cycle heat engine is a turbine.

3. The method of claim 1, where said open-cycle heat engine is a ramjet.

4. The method of claim 1, where said open-cycle heat engine is a pulsejet.

5. The method of claim 4, including additional steps of:
    measuring air pressure in an air stream of said pulsejet near said heat exchanger;
    communicating said air pressure measurement to said remote laser; and
    firing said remote laser in a pulse mode, such that a pulse of said optical radiation is delivered at or near a moment when said air pressure reaches a maximum value.

6. The method of claim 1, where said open-cycle heat engine is a reciprocating engine.

7. The method of claim 5, including additional steps of:
    measuring a phase angle of said reciprocating engine;
    communicating said phase angle measurement to said remote laser;
    firing said remote laser in a pulse mode, such that said pulse of said optical radiation is delivered at or near a moment when said phase angle of said reciprocating engine is at a point where a working fluid occupies a minimal volume.

8. The method of claim 1 including the additional steps of:
providing an optical concentrator on or near said open-cycle heat engine;
configuring said optical concentrator to focus said free space laser beam onto said optical absorber of a smaller area than a cross-sectional area of said free space laser beam;
measuring a position of the focused laser beam with respect to optical absorber; and
adjusting a position of said optical collector to maximize said optical radiation delivered to said optical absorber.

9. The method of claim 1 including the additional steps of:
providing an optical concentrator on or near said open-cycle heat engine;
configuring said optical concentrator to focus said free space laser beam onto a proximal face of an optical fiber bundle; configuring a distal end of said optical fiber bundle to deliver optical radiation to at least one optical absorber thermally coupled to at least one heat exchanger of said open-cycle heat engine;
Measuring the position of the focused laser beam with respect to the proximal face of an optical fiber bundle; and
adjusting mutual positions of said optical concentrator and a proximal face of said optical fiber bundle to maximize optical power delivered to said optical fiber bundle.

10. A method of powering a closed-cycle reciprocating heat engine with trapped working fluid with a pulsed-mode remote laser, comprising the steps of:
measuring the phase angle of said closed cycle reciprocating heat engine;
communicating said phase angle measurements to said remote laser;
firing said pulse-mode remote laser, such that a pulse of optical power is delivered at or near a moment when a phase angle of said closed-cycle reciprocating heat engine is at a point where said working fluid occupies a minimal volume;
collecting said optical power and turning it into heat;
delivering said heat to said working fluid of said closed-cycle reciprocating heat engine to create heated working fluid;
allowing said heated working fluid to expand and perform mechanical work through said closed-cycle reciprocating heat engine; and
allowing said expanded working fluid to cool down before an arrival of a subsequent laser pulse.

11. The method of claim 10, including the additional steps of:
heating a solid absorber with said optical power; and
heating said working fluid in said closed-cycle reciprocating heat engine with a heat exchanger having thermal contact with said solid absorber.

12. The method of claim 10, where the steps of heating a working fluid of said closed-loop reciprocating heat engine with said optical power are realized by:
providing said working fluid that is optically-absorptive to a wavelength of said pulsed-mode remote laser;
providing a window in a working chamber of said closed-loop reciprocating heat engine that is optically-transparent to said wavelength of said pulsed-mode remote laser; and
directing a laser beam of said pulsed-mode remote laser to said working fluid through said window.

13. The method of claim 10, where the optical power is delivered from said pulsed-mode remote laser to said closed-loop reciprocating heat engine with a free-space laser beam of said pulsed-mode remote laser.

14. The method of claim 13, including the additional steps of:
measuring a position of said closed-cycle reciprocating heat engine with respect to said pulsed-mode remote laser;
communicating said position measurements to said pulsed-mode remote laser; and
adjusting a direction and focusing of said pulsed-mode remote laser to maximize said optical power delivered to said closed-cycle reciprocating heat engine.

15. The method of claim 13, including the additional steps of:
providing an optical concentrator on or near said closed-cycle reciprocating heat engine;
configuring said optical concentrator to focus said free space laser beam on to said solid absorber having a smaller area than a cross-sectional area of said free space laser beam;
measuring a position of said free space laser beam with respect to said solid absorber; and
adjusting a position of said optical concentrator to maximize said optical power delivered to said solid absorber.

16. The method of claim 13, including the additional steps of:
providing an optical concentrator on or near said closed-cycle reciprocating heat engine;
configuring said optical concentrator to focus said free space laser beam onto a proximal face of an optical fiber bundle;
configuring distal ends of optical fibers of said optical fiber bundle to deliver said optical power to at least one solid absorber, said at least one solid absorber is thermally coupled to at least one heat exchanger of said closed-cycle reciprocating heat engine;
measuring a position of said focused laser beam with respect to said proximal face of said optical fiber bundle; and
adjusting mutual positions of said optical concentrator and said proximal face of said optical fiber bundle to maximize said optical power delivered to said optical fiber bundle.

17. The method of claim 10, where optical radiation is delivered from said pulsed-mode remote laser to said closed-cycle reciprocating heat engine with an optical fiber or an optical fiber bundle.

* * * * *